United States Patent
Bardalai (10) Patent No.: US 7,889,640 B2
(45) Date of Patent: Feb. 15, 2011

(54) SYSTEM AND METHOD FOR ESTABLISHING PROTECTED CONNECTIONS

(75) Inventor: Snigdho Chandra Bardalai, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 409 days.

(21) Appl. No.: 11/852,580

(22) Filed: Sep. 10, 2007

(65) Prior Publication Data

US 2008/0170857 A1 Jul. 17, 2008

Related U.S. Application Data

(60) Provisional application No. 60/829,642, filed on Oct. 16, 2006.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| G02F 1/00 | (2006.01) |
| G02F 2/00 | (2006.01) |
| H01S 3/00 | (2006.01) |
| H04B 10/00 | (2006.01) |
| H04J 14/00 | (2006.01) |

(52) U.S. Cl. .................. 370/225; 370/235; 398/5
(58) Field of Classification Search ......... 370/216–228, 370/235; 398/1, 2, 3, 5, 7, 8, 9, 10, 17, 59
See application file for complete search history.

(56) References Cited

U.S. PATENT DOCUMENTS

| | | | | |
|---|---|---|---|---|
| 5,646,936 | A | | 7/1997 | Shah et al. .................. 370/228 |
| 5,859,959 | A | * | 1/1999 | Kimball et al. ................ 714/4 |
| 6,701,448 | B1 | | 3/2004 | Akyol et al. ................... 714/4 |
| 6,718,387 | B1 | | 4/2004 | Gupta et al. ................ 709/226 |
| 6,738,624 | B1 | | 5/2004 | Aksentijevic et al. .... 455/452.1 |

(Continued)

OTHER PUBLICATIONS

B. Rajagopalan, J. Luciani, D. Awduche; "RFC 3717: IP over Optical Networks: A Framework"; Mar. 2004; retrieved from—http://www.rfc-editor.org/rfc/rfc3717.txt.*

Ohuchi, et al., Metro SONET System Supporting Optical Backbone Infrastructure: FLASHWAVE 4500, *Fujitsu Sci. Tech. J.*, 42,4, p. 454-459 (Oct. 2006).

(Continued)

*Primary Examiner*—Seema S Rao
*Assistant Examiner*—Xavier Szewai Wong
(74) *Attorney, Agent, or Firm*—Baker Botts L.L.P.

(57) ABSTRACT

A method for establishing protected connections includes determining a primary path to a first node through a first layer of a multi-layer network. The primary path comprises a plurality of first layer links. At least one link of the plurality of first layer links comprises at least one second layer link at a second layer. The method also includes determining a secondary path to the first node through the first layer. Upon detecting a first link of the plurality of first layer links is protected against link failure by the at least one second layer link the secondary path comprises the first link of the first layer. Additionally, upon detecting a second link of the plurality of first layer links is not protected against link failure by the at least one second layer link, the secondary path comprises a third link of the first layer.

23 Claims, 6 Drawing Sheets

U.S. PATENT DOCUMENTS

| | | | | |
|---|---|---|---|---|
| 7,174,387 | B1 | 2/2007 | Shand et al. | 709/238 |
| 7,269,132 | B1* | 9/2007 | Casey et al. | 370/219 |
| 7,471,625 | B2* | 12/2008 | Suemura | 370/223 |
| 7,647,426 | B2* | 1/2010 | Patel et al. | 709/239 |
| 7,697,505 | B2* | 4/2010 | White et al. | 370/351 |
| 2003/0137932 | A1* | 7/2003 | Nishioka et al. | 370/216 |
| 2004/0015590 | A1 | 1/2004 | Nagami et al. | 709/227 |
| 2004/0057724 | A1* | 3/2004 | Oksanen et al. | 398/5 |
| 2004/0120705 | A1* | 6/2004 | Friskney et al. | 398/5 |
| 2005/0013241 | A1* | 1/2005 | Beller et al. | 370/216 |
| 2005/0063299 | A1* | 3/2005 | Atkinson et al. | 370/216 |
| 2005/0089027 | A1 | 4/2005 | Colton | 370/380 |
| 2006/0092932 | A1 | 5/2006 | Ghosh et al. | 370/389 |
| 2007/0198710 | A1 | 8/2007 | Gopalakrishnan | 709/225 |
| 2008/0008168 | A1 | 1/2008 | Nadeau et al. | 370/389 |
| 2008/0101413 | A1 | 5/2008 | Bardalai | 370/474 |
| 2008/0107415 | A1 | 5/2008 | Bardalai | 398/58 |
| 2008/0112322 | A1 | 5/2008 | Bardalai | 370/235 |
| 2008/0219156 | A1* | 9/2008 | Caviglia et al. | 370/228 |

OTHER PUBLICATIONS

*SONET Telecommunications Standard Primer*, www.tektronix.com/optical.

Berger, L., Editor, Editor, *Generalized Multi-Protocol Label Switching (GMPLS) Signaling Resources ReserVation Protocol-Traffic Engineering (RSVP-TE) Extensions*; Movaz Networks, Jan. 2003. Network Working Group, Request for Comments: 3473, Category: Standards Track.

Lang, J., *Link Management Protocol (LMP)*, Sonos, Inc., Oct. 2005. Network Working Group, Request for Comments: 4204, Category: Standards Track.

Bardalai, et al., *System and Method for Providing Support for Multiple Control Channels*, U.S. Appl. No. 11/763,930, filed Jun. 15, 2007.

Bardalai, *System and Method for Discovering Neighboring Nodes*, U.S. Appl. No. 11/764,507, filed Jun. 18, 2007.

Bardalai, *System and Method for Rejecting a Request to Alter a Connection*, U.S. Appl. No. 11/764,525, filed Jun. 18, 2007.

\* cited by examiner

SYSTEM AND METHOD FOR ESTABLISHING PROTECTED CONNECTIONS

CROSS REFERENCE TO RELATED APPLICATIONS

This application claims the benefit of priority under 35 U.S.C. §119(e) of U.S. Provisional Application Ser. No. 60/829,642 filed Oct. 16, 2006, entitled Method and System for Path Protection Over MS-SPRing/BLSR Networks.

TECHNICAL FIELD

This invention relates generally to the field of communication networks and more specifically to a system and method for establishing protected connections.

BACKGROUND

An optical network uses optical signals to communicate information among the nodes of the network. This information often includes both data (e.g., a file that is being downloaded, packets carrying voices of a phone call, or the contents of a webpage) and signaling (e.g., commands or messages between nodes containing status or setup information). In some optical networks the data may be transferred using a data channel (e.g., a datalink) while the signaling is communicated using a control channel. The connections that transmit the data and signaling may be set up using a variety of different protocols. One such protocol often used in optical networks is Generalized Multiprotocol Label Switching, also known as GMPLS. The control plane of GMPLS is mainly designed for establishing connections within mesh networks using the concept of label swapping. Unfortunately, GMPLS has some shortcomings when it comes to establishing connections within Multiplex Section-Shared Protection Ring (MS-SPRing) or Bi-directional Line Switched Ring (BLSR) networks. For example, every add or drop to or from the ring needs to have a backup add or drop path in order to provide protection from node or link failures.

When determining how messages are to be sent between nodes, typically two paths are determined, a primary path and a secondary path. The secondary path provides backup should the primary path fail. In some optical networks, such as BLSR or MS-SPRing networks, resources such as links or nodes used by the primary path can be reused by the secondary path. However in other optical networks, such as mesh or Uni-directional Path Switched Ring (UPSR) networks, there needs to be complete diversity among the nodes and links used by the primary and secondary paths.

In a multilayer network, such as a network made up of different sub-networks and/or technology, it may not be possible for a lower-layer to effectively communicate status/connection information to the higher layer. As a result, the primary and secondary paths are typically determined manually or by separate management components.

SUMMARY OF THE DISCLOSURE

Particular embodiments provide a system and method for establishing protected connections that substantially eliminate or reduce at least some of the disadvantages and problems associated with previous methods and systems.

In accordance with a particular embodiment, a method for establishing protected connections includes determining a primary path to a first node through a first layer of a multi-layer network. The primary path comprises a plurality of first layer links. At least one link of the plurality of first layer links comprises at least one second layer link at a second layer. The method also includes determining a secondary path to the first node through the first layer. Upon detecting a first link of the plurality of first layer links is protected against link failure by the at least one second layer link the secondary path comprises the first link of the first layer. Additionally, upon detecting a second link of the plurality of first layer links is not protected against link failure by the at least one second layer link, the secondary path comprises a third link of the first layer.

Technical advantages of particular embodiments include providing protection at a higher layer of a multi-layer network based on the type of protection provided by a lower layer. Accordingly, where a link is protected by a lower layer, an alternate secondary path for that link is not needed.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of particular embodiments and their features and advantages, reference is now made to the following description, taken in conjunction with the accompanying drawings, in which.

DETAILED DESCRIPTION OF THE DRAWINGS

Figure 1:
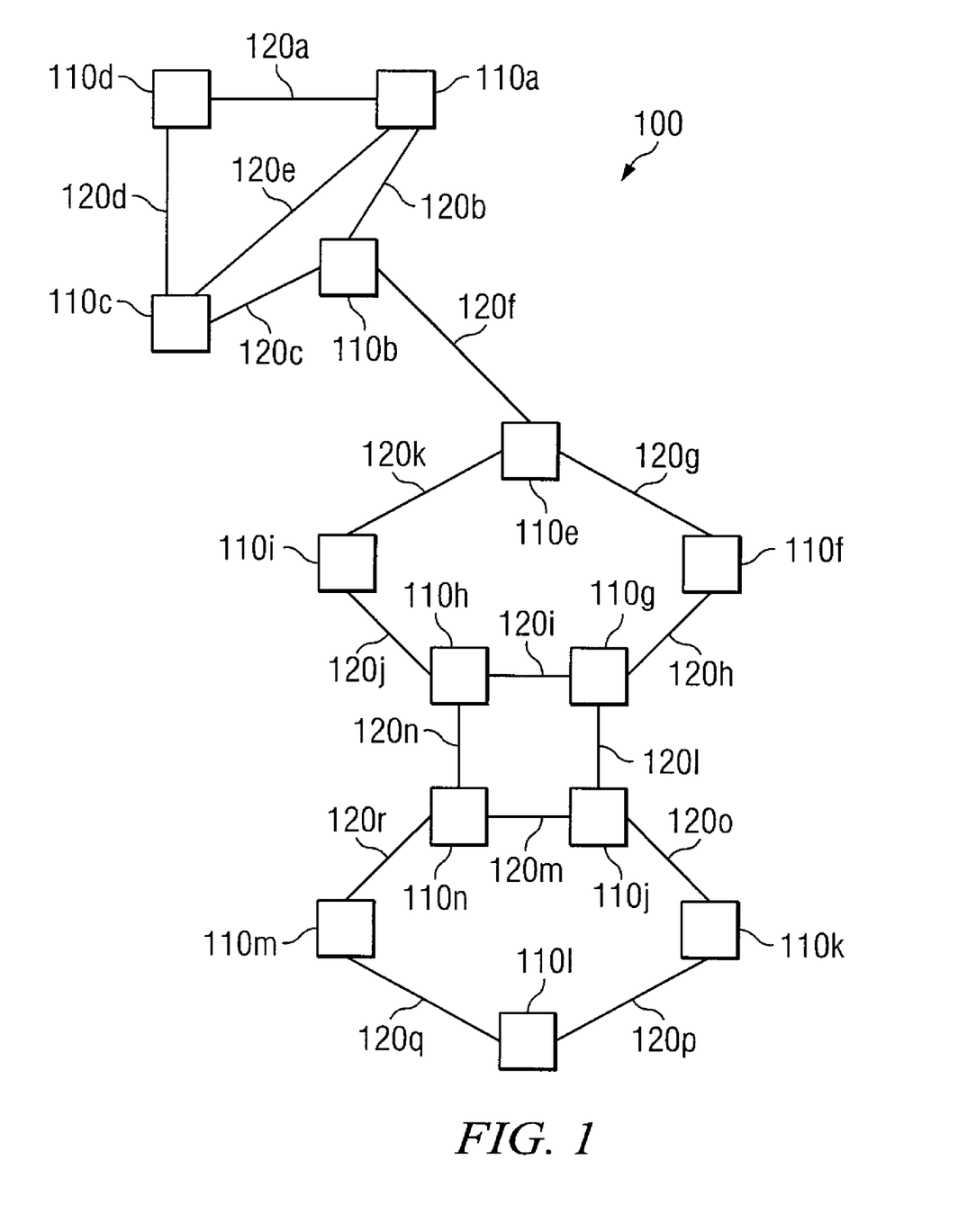
FIG. 1 is a block diagram illustrating an example embodiment of a mesh network coupled to multiple ring networks.

FIG. 1 is a block diagram illustrating an example embodiment of a mesh network coupled to multiple ring networks. Network 100 is a multi-layered network comprised of several nodes 110 physically coupled to one another via links 120. Nodes 110 may communicate both data (e.g., files or webpages) and signaling (e.g., control messages, routing messages, and link management messages) between each other using links 120. Data and signaling may be referred to collectively as messages. Nodes 110 and links 120 are arranged in two different topologies that are connected to one another via nodes 110*b* and 110*e* and link 120*f*. More specifically, nodes 110*a*-110*d* are arranged in a mesh network, and nodes 110*e*-110*i* and 110*j*-110*n* are arranged in two different ring networks. Each of these arrangements may be of a different layer. For example, network 100 may be the highest layer (e.g., it contains the other layers) and nodes 110*e*-110*i* may be at a lower layer.

In an optical network it is often desired that a path between two nodes is protected against the failure of one of the links of the path. From the perspective of a higher layer, the initial path, a primary path, may be protected by either providing an alternate route, a secondary path, or relying on the protection provided by a lower layer. This protection may provide increased robustness to the optical network, without wasting resources for redundant protection. More specifically, if a link is already protected from failure by the lower layer, then there may not be much benefit to also having a secondary path at the higher layer that also protects the same link. One way in which the higher layer may become aware of the protection provided by the lower layer is through the use of abstract links and/or nodes. These abstract links/nodes may be advertised at the higher layer as a single abstract link/node even though they may comprise several physical links and/or nodes at the lower layer. Thus, complete sub-networks at the lower layer may be represented in the higher layer as a single abstract link/node. The abstract links/nodes may be treated as physical links/nodes for purposes of routing in the higher layer. By providing the higher layer with the information needed for routing, it may be possible for the higher layer to, using for example a GMPLS control plane, incorporate the abstract link or node into a connection. Advertisements may also be generated by links 120 and nodes 110. Using information in these advertisements the higher layer may be able to determine which segments of the connection need to be protected by a secondary connection at the higher layer and which segments do not need protection at the higher layer because they are protected by the lower layer.

Network 100 may utilize any of a variety of different protocols to establish connections and route messages between nodes 110. For example, network 100 may use Generalized Multiprotocol Label Switching (GMPLS), Resource Reservation Protocol-Traffic Engineering (RSVP-TE), synchronous transport signal (STS) and/or Resilient Packet Ring (RPR) protocols. More specifically, GMPLS may be used to setup connections over mesh networks using the concept of label swapping, RSVP-TE may be used to establish label switched paths between nodes 110, and the RPR protocol be used to transport messages in a ring network with messages being added, passed through, or dropped at each node 110. According to some embodiments, network 100 may utilize any suitable transmission technique, such as Ethernet, Synchronous Optical Network (Sonet), or wavelength division multiplexing (WDM) techniques (e.g. dense wavelength division multiplexing (DWDM)). These different protocols/technologies and networks (e.g. each ring network) may be at different layers. For example, a Sonet network may include a DWDM network, the Sonet network would be at a higher layer than the DWDM network.

In some embodiments, network 100 may communicate messages in packets. A packet may comprise a bundle of data organized in a specific way for transmission. A packet may carry any suitable information such as voice, data, audio, video, multimedia, control, signaling, other information, or any combination of the preceding. The packets may comprise any suitable multiplexed packets, such as time division multiplexed (TDM) packets. One or more packets may be organized within a frame in a specific way for transmission.

Packets or frames may be communicated within portions of network 100 using an optical signal transmitted as light pulses. As an example, an optical signal may have a frequency of approximately 1550 nanometers and a data rate of 10, 20, 40, or over 40 gigabits per second. These light pulses may travel through any type of fiber suitable to transmit a signal. According to one embodiment, the fiber may include an optical fiber. An optical fiber typically comprises a cable made of silica glass or plastic. The cable may have an outer cladding material around an inner core. The inner core may have a slightly higher index of refraction than the outer cladding material. The refractive characteristics of the fiber operate to retain a light signal inside of the fiber. When the fiber is installed, several links may be within the same conduit. Because all the links within a conduit may fail at the same time (e.g., the conduit is severed), each of these links may be assigned the same shared risk link group identifier. Certain embodiments may attempt to avoid reusing links with the same shared risk link group identifier when determining the secondary path.

Network 100 may comprise or be a part of a local area network (LAN), a wide area network (WAN), a cellular network, a global distributed network such as the Internet, an Intranet, an Extranet, a radio network (RN), a CDMA network, a GSM network, a TDMA network, a satellite network or any other form of wireless or wireline networking. The mesh network and ring networks may be smaller networks within network 100 and may use different technologies and/or techniques to route data. These different sub-networks may be at a lower layer than network 100. In other words, the lower layer networks are completely contained within the higher layer. This may allow for a multi-layer network in which different layers are using different technologies. For example, network 100 may be a Sonet over DWDM, Ethernet over Sonet, or any other layering of different technologies. Network 100 may also comprise nested layers within a particular technology. For example, there may be a Sonet section, Sonet line, or Sonet path layers. In addition, there may be abstract domains, such as external network to network interface (ENNI) over internal network to network interface (INNI) domains.

Nodes 110 may include any suitable type of networking device such as a network entity, a cross connect, a database, a regenerating unit, a dense wavelength division multiplexer, an access gateway, an endpoint, a softswitch server, a trunk gateway, an access service provider, an Internet service provider, or any other device operable to route packets to, from or within network 100.

Modifications, additions, or omissions may be made to network 100 without departing from the scope of the invention. The components of network 100 may be integrated or separated according to particular needs. Moreover, the operations of network 100 may be performed by more, fewer, or other devices. Additionally, operations of network 100 may be performed using any suitable logic. As used in this document, "each" refers to each member of a set or each member of a subset of a set.

Figure 2:
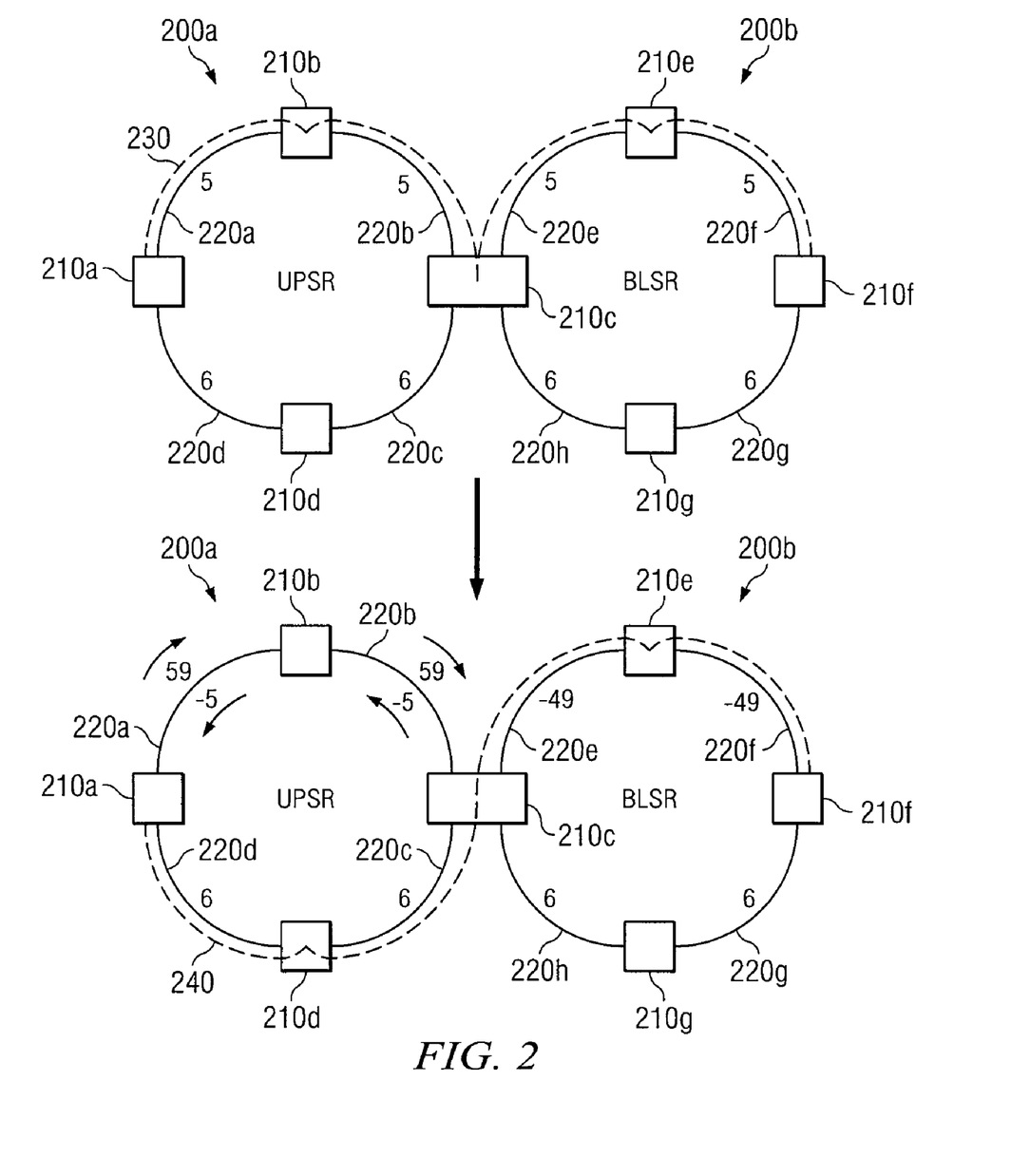
FIG. 2 is a block diagram illustrating an example embodiment of cost calculations used in determining a primary and secondary path between two nodes.

FIG. 2 is a block diagram illustrating an example embodiment of cost calculations used in determining a primary and secondary path between two nodes. FIG. 2 includes two different types of ring networks connected to one another. More specifically, UPSR network 200a is connected to BLSR network 200b via node 210c. Similar to network 100, ring networks 200 are essentially comprised of two different components, nodes 210 and links 220. Accordingly, nodes 210 and links 220 may comprise any devices, components, features or functions of any of the nodes or links discussed above.

Assume that node 210a wants to establish a connection with node 210f and thus a primary and secondary path to node 210f may need to be determined. Further assume that node 210a has received information that it may use to determine a cost associated with each link of ring networks 200. More specifically, links 220a, 220b, 220e, and 220f have a cost five associated therewith and links 220c, 220d, 220g and 220h have a cost of six associated therewith. The cost information may be stored in memory within node 210a. The original cost of a particular link may reflect the length, bandwidth, protocol and/or any other desired or appropriate metric used in determining the cost associated with that particular link.

To determine the primary path, node 210a may simply look for the lowest cost path using a modified Dijkstra algorithm. As may be apparent in this rather simple network the lowest cost path goes through the four links (220a, 220b, 220e, and 220f) having a cost of five associated therewith. Thus, primary path 230 leaves from node 210a, passes through nodes 210b, 210c and 210e and arrives at node 210f via links 220a, 220b, 220e, and 220f.

In order to determine the secondary path, the processor of node 210a may adjust the cost associated with the links used for the primary path, more specifically links 220a, 220b, 220e, and 220f. This may involve several steps beginning with a determination of an adjustment value. The adjustment value may be determined by summing the original costs of each link along with a predetermined constant. Thus, if the predetermined constant used is ten, then the adjustment value would be fifty-four (5+5+5+5+6+6+6+6+10=54).

Node 210a may then split each non-BLSR link along the primary path into two uni-directional links having the same cost. More specifically, links 220a and 220b may be split into two separate uni-directional links having the same cost associated therewith (the cost of the two separated links may be the same as the cost of the link before it was separated, five). Each of the two separated links may be responsible for carrying messages in a different direction. More specifically, one of the separated links may transmit messages clockwise, while the other may transmit messages counter-clockwise.

Then the cost associated with each of the two separated links may be adjusted based on whether the link direction is in the same or opposite direction as the primary path. More specifically, the adjustment value may be added to the cost of the separated link that transmits messages in the same direction as primary path 230. Accordingly, the cost of the separated link associated with link 220a that transmits messages towards node 210b may be increased to fifty-nine (5+54=59). Similarly, the cost of the separated link associated with link 220b that transmits messages towards node 210c may be increased to fifty-nine. For the separated link that transmits data in the opposite direction as primary path 230 the cost of the link may be the negative of the original cost. Accordingly, the cost of the separated link associated with link 220a that transmits messages towards node 210a may be set to be negative five. Similarly, the cost of the separated link associated with link 220b that transmits messages towards node 210b may be set to be negative five. Node 210a may also adjust the cost of links 220 in BLSR 200b. More specifically, the cost of each BLSR 200b link used by primary path 230 may be decreased by the adjustment value. Accordingly, the adjusted cost of links 220e and 220f may both be negative forty-nine (5−54=49).

Once the adjusted cost of links 220 has been determined, node 210a may again use the modified Dijkstra to determine the least expensive path from node 210a to node 210f. Because the cost of links 220a and 220b has been increased by the adjustment value and the cost of links 220e and 220f has been decreased by the adjustment value these four links will bear the highest and lowest cost, respectively. This may ensure that when the modified Dijkstra calculates secondary path 240 it does not reuse resources within UPSR 220a (recall that a UPSR network does not permit reuse of resources for the secondary path) but then takes advantage of being able to reuse BLSR resources in BLSR 200b.

In addition to ensuring that links in specific types of networks are not reused, particular embodiments may also attempt to avoid reusing nodes in certain types of networks. In some embodiments, it may also be desirable to avoid reusing links having the same shared risk link group ID (e.g. separate links that share a common physical path, such as the same conduit).

It should be noted that, in some embodiments, secondary path 240 may be referred to as a bypass connection. Furthermore, in some embodiments, node 210a may be referred to as a bridge point because it marks the point at which the primary and secondary paths diverge. In particular embodiments, a drop-and-continue cross connect may be created at the bridge point so as to allow traffic to be sent out along the two paths (e.g., the primary and secondary paths). Additionally, in some embodiments node 210c may be referred to as a merge point because it marks the point at which the primary and secondary paths converge. In particular embodiments, a service-selector cross connect may be created at the merge point so as to allow traffic to be received from two paths (e.g., the primary and secondary).

Figure 3A:
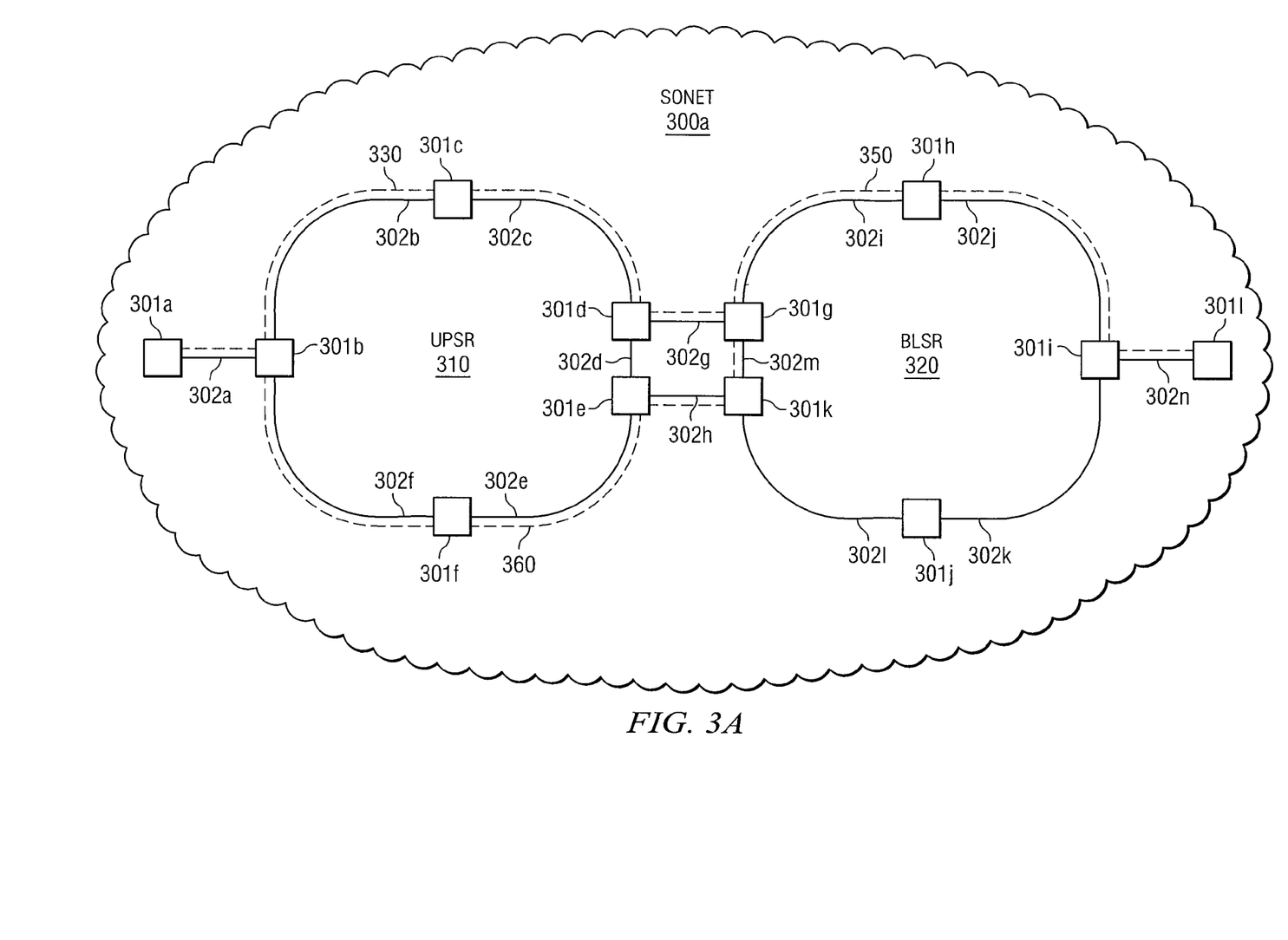
FIGS. 3 and 4 are block diagrams illustrating how an abstract link may be used to advertise the protection of a lower layer in two different multilayered networked.
Figure 3B:
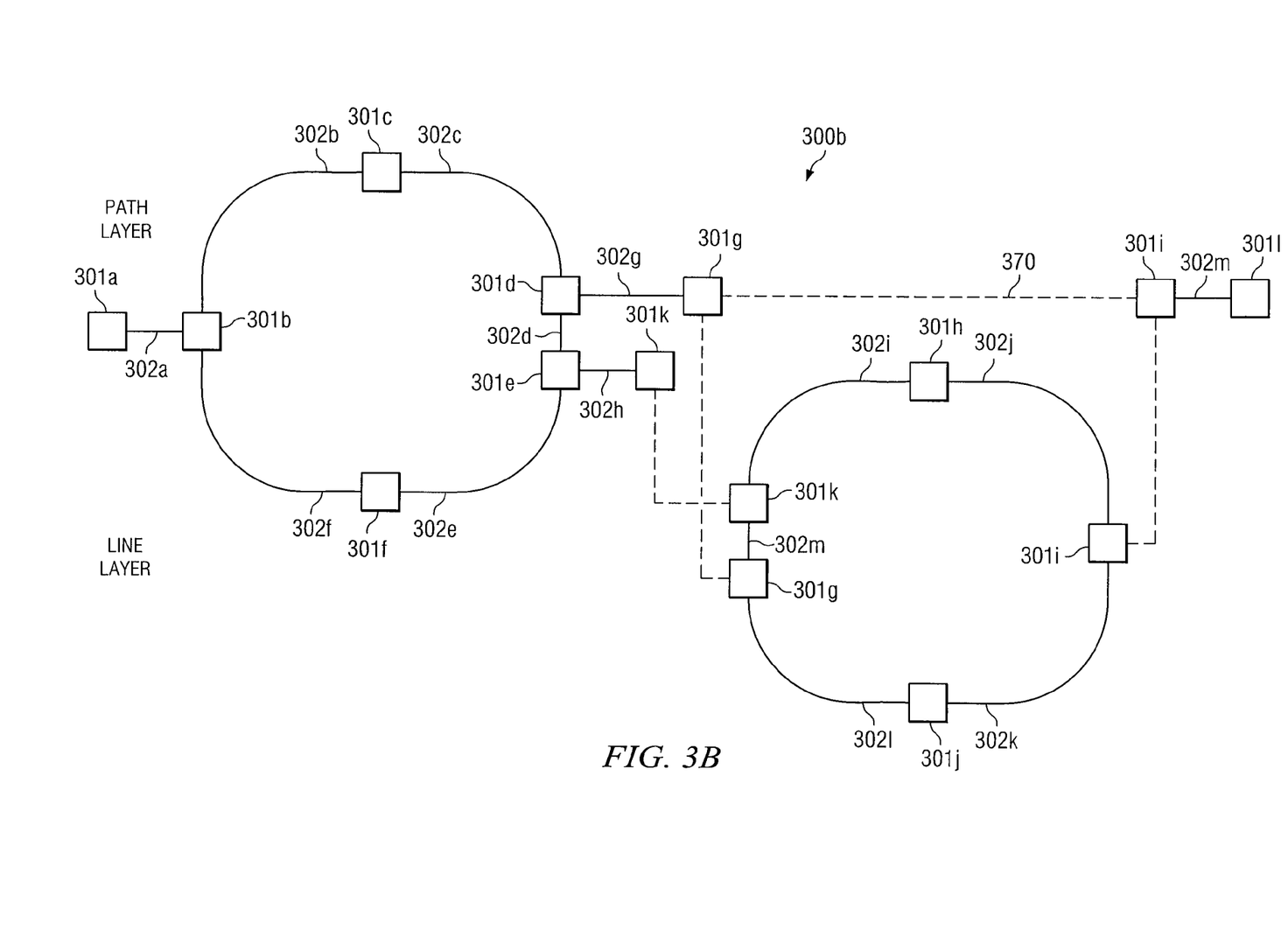
Figure 4A:
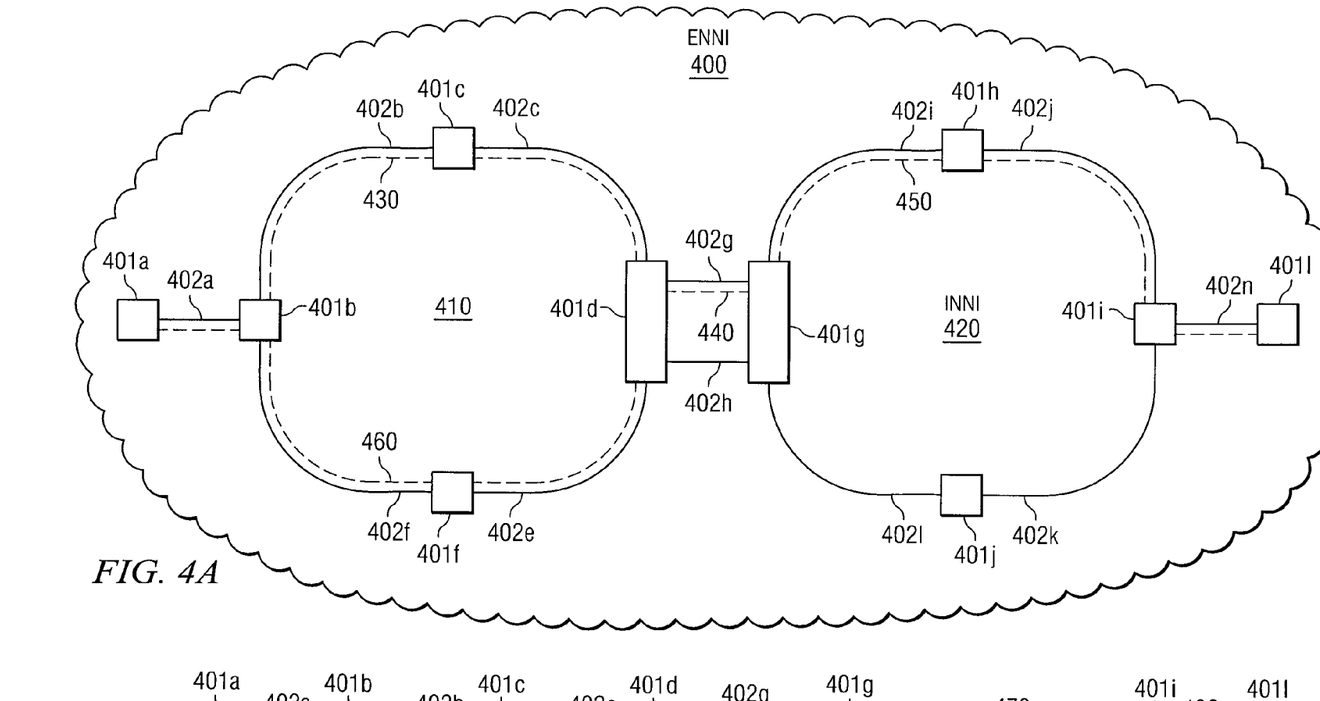

FIGS. 3 and 4 are block diagrams illustrating how an abstract link may be used to advertise the protection of a lower layer in two different multilayered networks. More specifically, FIG. 3 depicts Sonet network 300 that includes a UPSR ring 310 and a BLSR ring 320 and FIG. 4 depicts an abstract ENNI network 400, that includes a ring network 410, and an abstract INNI network 420. Ring 410 may be a part of the same layer as ENNI 400 while INNI 420 may be at a lower layer. In both of these figures, a connection from node 301a/401a to 301l/401l is protected at the higher level in part by secondary path 360/460 and in part by the protection of abstract link 370/470. In order for the higher layer control plane to be aware of, and take advantage of, the protection provided by the lower layer, an advertisement for abstract link 370/470 may be generated. The advertisement may be similar to the advertisements generated for links 302/402. More specifically, the advertisement may provide any needed routing information about abstract link 370/470 or links 302/402. From the perspective of the higher layer, abstract link 370/470 may appear to be another physical link. In representing the lower layer links, abstract link 370/470 may have a certain protection type that is based on the type of protection afforded by the lower layer links.

In particular embodiments, the advertisement for a link may represent the type of protection supported by that link. This may be represented using one of four identifiers: "Unprotected" for a link that has no protection mechanism; "Shared" for a link that has protection from a lower layer protection mechanism such as shared restoration or 1:n; "Enhanced" for a link that has protection from a lower layer protection mechanism such as BLSR; or "1+1 Dedicated" for a link that is protected by dedicated resources that are not shared with other end-to-end services in the lower layer.

With respect to FIG. 3, assume that a Sonet connection is to be established between nodes 301a and 301l. This connection must pass through two networks, UPSR 310 and BLSR 320. Further assume that this is a multi-layered optical network in which it is desired that the control plane for the Sonet layer (e.g., the higher layer) establishes a connection that is protected end-to-end (e.g., from node 301a to 301l). Accordingly, the connection includes a primary path, which includes paths 330 and 350, and a secondary path, which includes path 360. More specifically, path 330 is protected by path 360 and path 350 is protected by the protection type of a lower layer.

It may now be helpful to examine the connection link-by-link beginning with links 302b and 302c. Links 302b and 302c are part of UPSR 310 and are not able to provide protection through a lower layer. Thus, the advertisement of the features of links 302b and 302c may include data indicating that these links have an "Unprotected" protection type. Upon determining that links 302b and 302c are unprotected, an alternate or secondary path, path 360, may be determined to protect path 330 (links 302b and 302c). As can be seen in FIG. 3B, both the primary and secondary paths are in the higher path layer.

Moving now to the interconnection of UPSR 310 and BLSR 320, link 302g is the primary connection between UPSR 310 and BLSR 320 while link 302h is the secondary or backup link. More specifically, link 302g is protected by link 302h. Note that this allows both the entry and exit points into UPSR 310 and BLSR 320 to be unique, protecting against link and node failure.

Entering BLSR 320, links 302i and 302j may be protected by a lower layer. In this case, the protection may be inherent in the type of network. More specifically, because BLSR 320 is a BLSR network, it may inherently support a mechanism by which its links are protected against failure. For example, if link 302j were to fail, data traveling along path 350 would reach the failed link, link 302j, and then reverse directions traveling in the opposite direction along the ring of BLSR 320. This takes advantage of the bidirectional capabilities inherent in a BLSR network. To simplify routing at the higher layer, BLSR 320 may simply be represented as abstract link 370. Abstract link 370 may be advertised as part of the higher layer routing information. Part of this advertisement may include an indication of the type of protection provided by abstract link 370. For example, the advertisement may indicate that abstract link 370 is able to provide "Enhanced" protection. The control plane of the higher layer may interpret this to mean that the link is protected by a protection mechanism such as BLSR. Besides the protection of abstract link 370 the advertisement may include other information that may be needed to establish connection without providing all the detail of the physical links (e.g., links 302i and 302j) that may be represented by abstract link 370. Because path 350 is protected by BLSR 320 there may not be any need for a secondary or alternate path. In some embodiments BLSR 320 may be represented by an abstract node.

Thus, from the perspective of the higher layer, the connection between nodes 301a and 301l is protected, either by a secondary path (e.g., path 360) or by the protection provided by the link itself (e.g. abstract link 370).

Figure 4B:
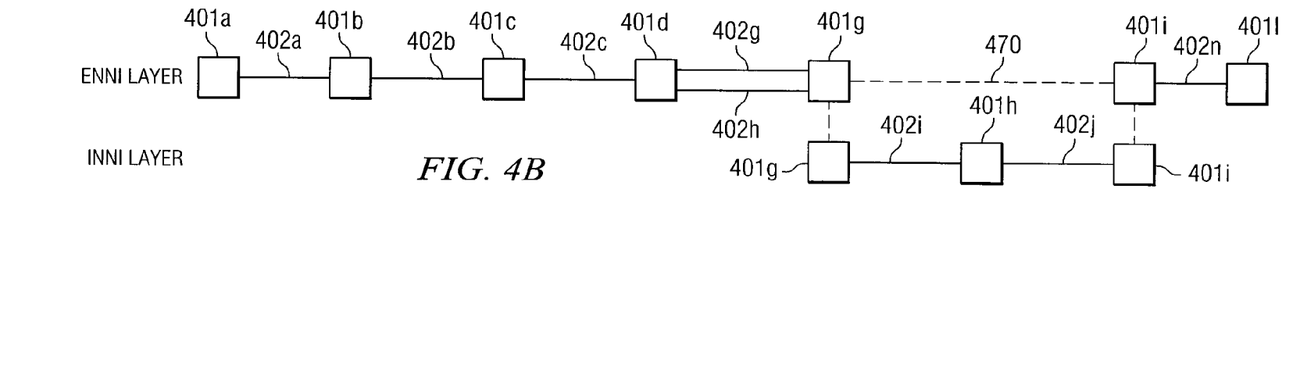

With respect to FIG. 4, ENNI 400 (including ring 410) and INNI 420 represent abstract protection domains. These domains may represent any of a variety of different domains. For example, they may represent different service providers or particular administrative decisions on how to divide a network. In some embodiments, the different domains may incorporate different technology, for example, ENNI 400 may be implemented as Sonet over DWDM. These domains may be abstracted at different layers (e.g., to hide certain types of domain information from other domains). More specifically, ENNI 400, which comprises ring 410 and all of its nodes 401 and links 402, represents a higher layer protection domain than INNI 420. Thus, INNI 420 is at a lower layer than ENNI 400 and may be completely contained therein. In other words, INNI 420 may be a separate protection domain encompassed by ENNI 400. The distinction between the higher/lower layer may be seen in FIG. 4B. Thus it can be seen that while INNI 420 is a part of ENNI 400, it is at a lower layer than ring 410 which is also a part of ENNI 400. It may be noted that from the perspective of the higher layer, nodes 401 and links 402 of the lower layered INNI 420 do not exist, all the higher layered ENNI 400 sees is abstract link 470.

In order to help illustrate how a connection may be protected, and the role abstract link 460 plays, assume that a connection between nodes 401a and 401l is to be established by the higher layer of ENNI 400. A control plane (e.g., the GMPLS control plane) for ENNI 400 may establish this connection so that it is protected end-to-end (e.g., from node 401a to 401l). The links and nodes used for the connection may be selected based on the routing information available at the higher level. The routing information may be received from advertisements corresponding to the various links and nodes of ENNI 400. This may include abstract links (e.g. abstract link 470) and nodes which, from the perspective of ENNI 400, may appear to be physical links or nodes. The advertisement related to abstract link 470 may allow the lower layered INNI 420 to present its protection information to the higher layered ENNI 400.

The connection between nodes 401a and 401b may include a primary path (paths 430 and 450) that is protected in part by a secondary path (path 460) and in part by the protection inherent in certain links and nodes. More specifically, links 402b and 402c of path 430, residing in the ENNI layer, may not be able to provide any protection against their failure. Thus, path 460 (links 402e and 402f) may be set up as a secondary or backup path should one of links 402b or 402c of path 430 fail. The connection between ring 410 and INNI 420 may be protected by Sonet 1+1 line layer protection in which a single link is protected by redundant equipment that automatically switches if the primary equipment or link fails. This is shown by links 402g and 402h between nodes 401d and 401g. This protection may be identified by "1+1 Dedicated" in an advertisement for link 402g. Thus, from ENNI 400's perspective, even though there is not a secondary connection between ring 410 and INNI 420, path 440 is protected by the 1+1 line protection. The last portion of the connection between nodes 401a and 401l, path 450, may be protected by the INNI 420, as represented by abstract link 470. From the perspective of ENNI 400, INNI 420 does not exist, rather all that ENNI 400 sees is abstract link 470. Because abstract link 470 is able to provide protection against link failure through INNI 420, ENNI 400 may not need to establish a secondary path for this portion of the connection. Abstract link 470 may have included "Enhanced" or "Shared" protection depending on the characteristics and technology of INNI 420.

Figure 5:
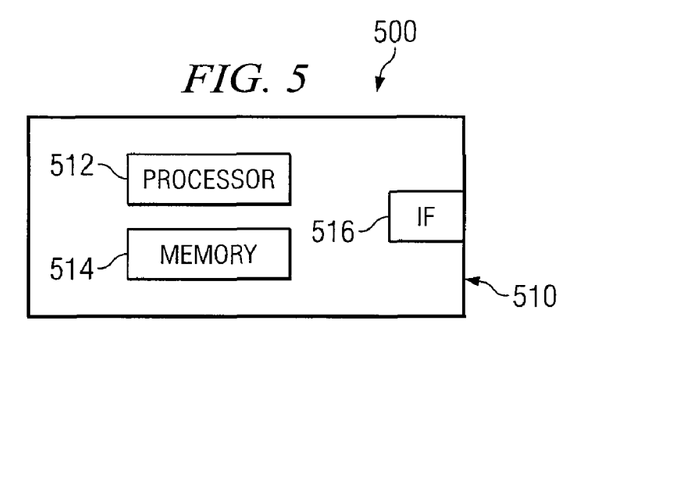
FIG. 5 is a block diagram illustrating an example embodiment of the internal components of a node.

FIG. 5 is a block diagram illustrating an example embodiment of the internal components of a node. For simplicity, node 510 has been depicted in isolation, though in use node 510 may be connected to multiple other nodes, such as any of the nodes depicted in FIGS. 1-4. Depending on the embodiment, node 510 may comprise more or fewer internal components, and one or more of the components may be external to node 510.

Processor 512 may be a microprocessor, controller, or any other suitable computing device, resource, or combination of hardware, software and/or encoded logic operable to provide, either alone or in conjunction with other node 510 components, such as memory 514 and interface 516, node functionality. Such functionality may include providing various features discussed herein to a network, such as network 100 of FIG. 1. Such features may include generating and/or receiving advertisements containing information related to the type of protection provided by physical or abstract links. The features may also include determining both a primary and secondary path to a remote node. In doing so processor 512 may use a modified Dijkstra algorithm to determine the shortest/least expensive path to the remote node. Processor 512 may also be used in adjusting various costs associated with the components (e.g., nodes or links) used in the primary path. For example, processor 512 may increase the cost of a particular non-BLSR link in the direction of the primary path by an adjustment value, while decreasing the cost of the non- BLSR link in the opposite direction. Processor 512 may also be used in determining the adjusted value.

Memory 514 may be any form of volatile or non-volatile memory including, without limitation, magnetic media, optical media, random access memory (RAM), read-only memory (ROM), removable media, or any other suitable local or remote memory component. Memory 514 may store any suitable instructions, data or information, including software and encoded logic, utilized by node 510. For example, in some embodiments memory 514 may store a table, or other such organization of data, correlating a protection type with a particular link. Memory 514 may also store the cost associated with various links and nodes. Memory 514 may additionally store the adjustment value after it has been calculated by processor 512. For example, processor 512 may load the original link costs stored in memory 514 and use them in calculating the adjustment value which may then be stored in memory 514. Processor 514 may then load the adjustment value from memory 514 to determine an adjusted cost for certain links which may then be stored in memory 514.

Interface 516 may be used in the communication of signaling and/or data with other nodes. For example, via interface 516 node 510 may receive a message comprising information related to the cost of one or more links. The number and type of interfaces 516 included with node 510 may be based on the number and type of networks to which node 510 is coupled. For example, node 510 may be coupled to an optical network and a broadcast network. In such a situation interface 516 may comprise a point-to-point optical interface and a broadcast network interface.

Figure 6:
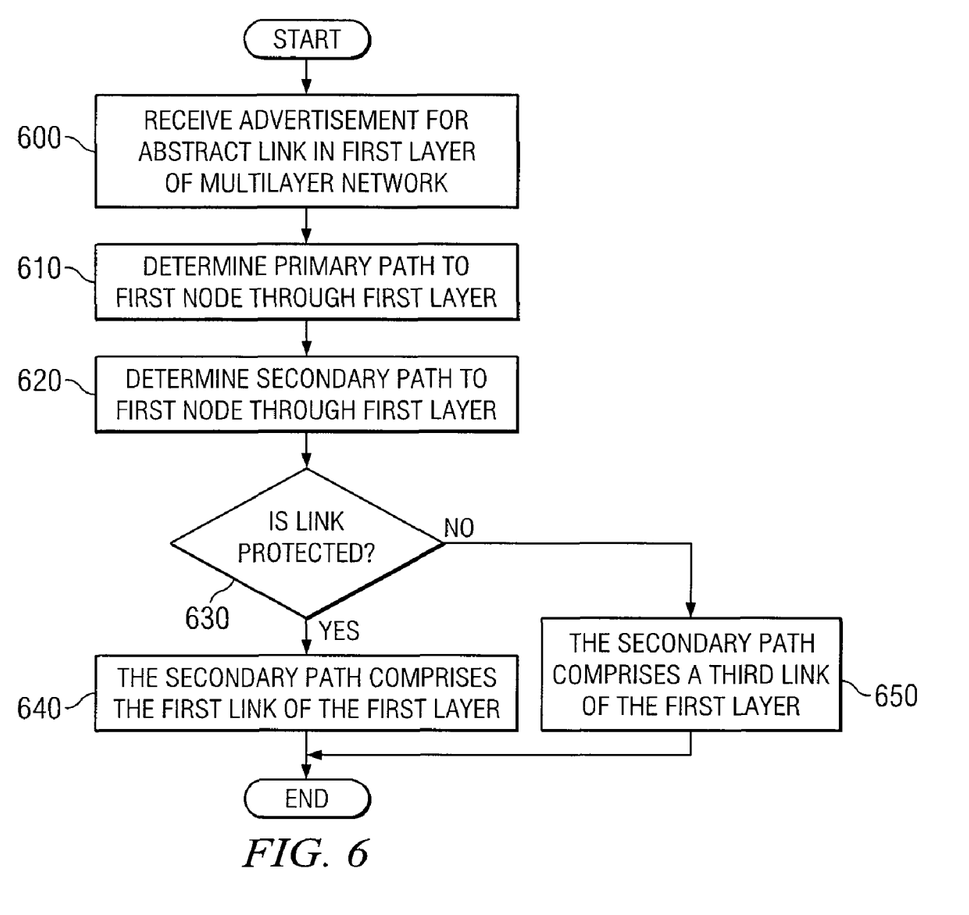
FIG. 6 is a flowchart illustrating an example embodiment of a method for establishing protected connections.

FIG. 6 is a flowchart illustrating an example embodiment of a method for establishing protected connections. For purposes of this method it may be assumed that a connection needs a primary path that is protected by a secondary path, and that the secondary path may reuse some of the resources used by the primary path. For simplicity, the method is discussed from the perspective of a local node. The local node may be similar to any of the nodes discussed above.

The method begins at step 600 with the receipt of an advertisement from an abstract link in a first layer of a multilayer network. The abstract link may be similar to abstract links 370 or 470. More specifically, the abstract link may represent a smaller network at a second layer. The second layer may be lower than the first layer. More specifically, the first layer may contain the entire second layer. The advertisement may include protection information indicating the type of protection provided by the abstract link. The advertisement may indicate the type of protection by using one of the four identifiers discussed above ("Unprotected", "Shared", "Enhanced", "1+1 Dedicated"). Advertisements from other links, including physical links (e.g., links 302/402), physical nodes (e.g., nodes 301/401), abstract nodes, and other abstract links, may also be received.

At step 610 a primary path through the first layer to the first node is determined. The primary path may include both physical links and abstract links. In determining the primary path, the type of protection provided by each link of the primary path may be noted.

At steps 630, 640, and 650 the secondary path through the first layer to the first node is determined. Depending on whether a link of the primary path is protected, the secondary path will either comprise the same link or a new link. More specifically, if a particular link of the primary path is protected (as determined from the advertisement corresponding to that link) then at step 640 that link is reused as part of the secondary path; if the link of the primary path is not protected then at step 650 a third link is used as part of the secondary path. In the first scenario in which the link is protected there is no need to provide an additional link to protect against the first links failure because the link has already communicated that it is protected. Conversely, if the link is not already protected then an alternate link(s) need to be used to provide a second path should the first link fail.

In some embodiments, both the primary and secondary paths may be calculated together. This may allow for more protected links to be used in the primary path to reduce the number of resources used by the secondary path.

Modifications, additions, or omissions may be made to the method without departing from the scope of particular embodiments. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for establishing protected connections, comprising:

at a second node, determining a primary path to a first node through a first layer of a multi-layer network, the primary path comprising a plurality of first layer links, at least one link of the plurality of first layer links associated with one or more second layer links at a second layer;

receiving at the second node an advertisement corresponding to a first link of the plurality of first layer links, the advertisement indicating an abstract link protects the first link against link failure using one or more of the second layer links;

at the second node, determining a secondary path to the first node through the first layer, wherein:

upon detecting that the first link of the plurality of first layer links is protected against link failure by a second layer link based on the advertisement, determining that the secondary path comprises the first link of the first layer; and upon detecting that a second link of the plurality of first layer links is not protected against link failure by the at least one second layer link, determining that the secondary path comprises another link of the first layer not included in the primary path.

2. The method of claim 1, wherein:

the primary path and the secondary path further comprise at least one node and pass through at least one protection domain; and determining the secondary path to the first node through the first layer such that an entry node and an exit node to the at least one protection domain is different for the primary path and the secondary path.

3. The method of claim 2, wherein the at least one protection domain is selected from the group consisting of a unidirectional path switched ring (UPSR) domain, a bidirectional link switched ring (BLSR) domain, an internal network to network interface (INNI) domain, an external network to network interface (ENNI) domain, a dense wavelength division multiplex (DWDM) domain, and a Sonet domain.

4. The method of claim 1, further comprising determining whether each link of the plurality of links of the first layer is protected at a control plane.

5. The method of claim 1, further comprising advertising a first abstract protection type for at least one link of the second layer.

6. The method of claim 5, wherein the first abstract protection type is selected from the group consisting of an unprotected protection type, a shared protection type, an enhanced protection type, and a 1+1 dedicated protection type.

7. The method of claim 1, determining a secondary path to the first node through the first layer such that first layer links of the primary path are of a different shared risk link group than the first layer links of the secondary path.

8. A system for establishing protected connections, comprising:
an interface configured to receive an advertisement corresponding to a first link of a plurality of first layer links of a multi-layer network, the advertisement indicating an abstract link protects the first link against link failure using one or more of the second layer links of the multi-layer network; and
a processor coupled to the interface and configured to:
determine a primary path to a first node through a first layer of a multi-layer network, the primary path comprising a plurality of the first layer links, at least one link of the plurality of first layer links associated with one or more second layer links at a second layer;
determine a secondary path to the first node through the first layer, wherein:
upon the interface detecting that the first link of the plurality of first layer links is protected against link failure by a second layer link based on the advertisement, determining that the secondary path comprises the first link of the first layer; and
upon the interface detecting that a second link of the plurality of first layer links is not protected against link failure by the at least one second layer link, determining that the secondary path comprises another link of the first layer not included in the primary path.

9. The system of claim 8, wherein the interface is further configured to receive an advertisement corresponding to the first link of the plurality of first layer links, the first link comprising an abstract link protected against link failure by the at least one second layer link.

10. The system of claim 8, wherein:
the primary path and the secondary path further comprise at least one node and pass through at least one protection domain; and
the processor configured to determine the secondary path to the first node through the first layer such that an entry node and an exit node to the at least one protection domain is different for the primary path and the secondary path.

11. The system of claim 10, wherein the at least one protection domain is selected from the group consisting of a unidirectional path switched ring (UPSR) domain, a bidirectional link switched ring (BLSR) domain, an internal network to network interface (INNI) domain, an external network to network interface (ENNI) domain, a dense wavelength division multiplex (DWDM) domain, and a Sonet domain.

12. The system of claim 8, wherein the interface is further configured to determine whether each link of the plurality of links of the first layer is protected at a control plane.

13. The system of claim 8, wherein the interface is further configured to advertise a first abstract protection type for at least one link of the second layer.

14. The system of claim 13, wherein the first abstract protection type is selected from the group consisting of an unprotected protection type, a shared protection type, an enhanced protection type, and a 1+1 dedicated protection type.

15. The system of claim 8, wherein the processor configured to determine a secondary path to the first node through the first layer such that first layer links of the primary path are of a different shared risk link group than the first layer links of the secondary path.

16. A non-transitory computer-readable medium comprising logic, the logic operable when executed by a processor to:
determine a primary path to a first node through a first layer of a multi-layer network, the primary path comprising a plurality of first layer links, at least one link of the plurality of first layer links associated with one or more second layer links at a second layer;
receive an advertisement corresponding to a first link of the plurality of first layer links, the advertisement indicating an abstract link protects the first link against link failure using one or more of the second layer links;
determine a secondary path to the first node through the first layer, wherein:
upon detecting that the first link of the plurality of first layer links is protected against link failure by a second layer link based on the advertisement, determining that the secondary path comprises the first link of the first layer; and
upon detecting that a second link of the plurality of first layer links is not protected against link failure by the at least one second layer link, determining that the secondary path comprises another link of the first layer not included in the primary path.

17. The medium of claim 16, wherein the code is further configured to receive an advertisement corresponding to the first link of the plurality of first layer links, the first link comprising an abstract link protected against link failure by the at least one second layer link.

18. The medium of claim 16, wherein:
the primary path and the secondary path further comprise at least one node and pass through at least one protection domain; and
the code configured to determine the secondary path to the first node through the first layer such that an entry node and an exit node to the at least one protection domain is different for the primary path and the secondary path.

19. The medium of claim 18, wherein the at least one protection domain is selected from the group consisting of a unidirectional path switched ring (UPSR) domain, a bidirectional link switched ring (BLSR) domain, an internal network to network interface (INNI) domain, an external network to network interface (ENNI) domain, a dense wavelength division multiplex (DWDM) domain, and a Sonet domain.

20. The medium of claim 16, wherein the code is further configured to determine whether each link of the plurality of links of the first layer is protected at a control plane.

21. The medium of claim 16, wherein the code is further configured to advertise a first abstract protection type for at least one link of the second layer.

22. The medium of claim 21, wherein the first abstract protection type is selected from the group consisting of an unprotected protection type, a shared protection type, an enhanced protection type, and a 1+1 dedicated protection type.

23. The medium of claim 16, wherein the code configured to determine a secondary path to the first node through the first layer such that first layer links of the primary path are of a different shared risk link group than the first layer links of the secondary path.

* * * * *